Feb. 10, 1931.    H. J. MORGAN    1,791,968
WELDING METHOD
Filed Jan. 14, 1929

INVENTOR:
Harry J. Morgan
BY White, Prost & Fryer
ATTORNEYS.

Patented Feb. 10, 1931

1,791,968

UNITED STATES PATENT OFFICE

HARRY J. MORGAN, OF WALNUT PARK, CALIFORNIA, ASSIGNOR TO P. L. & M. COMPANY, OF LOS ANGELES, CALIFORNIA, A CORPORATION OF CALIFORNIA

WELDING METHOD

Application filed January 14, 1929. Serial No. 332,441.

This invention relates generally to methods of applying hard metal facing material to softer metal bodies, and to compositions for use in such processes. It is particularly adapted for producing facings of extreme hardness upon the cutting edges or wearing surfaces of various tools.

It is an object of this invention to devise a method of applying material for forming a hard metal facing, which will facilitate application of the materials uniformly and will facilitate its fusion with electrical welding apparatus.

It is a further object of this invention to devise a plastic composition which can be utilized in my welding process.

Further objects of the invention will appear from the folowing description in which I have set forth the preferred embodiment of my invention. It is to be understood that the appended claims are to be accorded a range of equivalents consistent with the state of the prior art.

Referring to the drawing.

Figure 1:
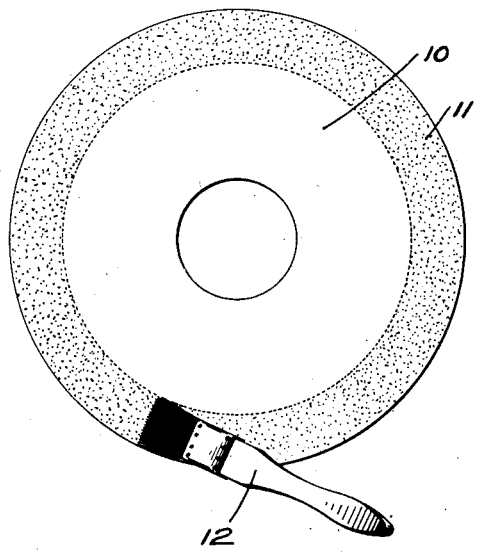
Figure 1 is a plan view showing the composition of my invention being applied to the surface of a tool to be faced.

In my copending application Serial No. 299,636, filed August 14, 1928, I have disclosed a process of forming a hard tungsten carbid facing upon a soft metal body, which utilizes certain tungsten containing ingredients in granular form. A granular material of this kind can be conveniently applied to the surface of the body upon which the facing is to be formed, and is then electrically fused to form the desired facing. Under certain conditions and for certain classes of work I have found that it is difficult to secure a facing of the desired uniformity and smoothness by this method and composition, and applications are sometimes rendered inconvenient when the surface of the body is not in a horizontal position. In the method of this invention I utilize a plastic mixture of certain necessary ingredients, and this mixture is spread upon the surface of the body, after which it is electrically fused.

In the preferred embodiment of my invention I utilize powdered unwrought tungsten, as this material is ordinarily available upon the open market. This material is homogeneously mixed with a proper amount of divided carbon, together with an amount of water or other vaporized liquid sufficient to produce a plastic composition. A certain amount of coloidal material such as dextrine can also be added. While the consistency of this composition should be such that it can be readily spread out or brushed upon the surface to which the facing is to be applied, care should be taken not to add such an amount of water that the tungsten particles will settle from the carbon. The tungsten carbide facing which I prefer to form by my method may contain from 3 to 10% of carbon, although a facing containing about 4½% carbon appears to be of maximum hardness.

The amount of carbon necessary in the plastic composition in order to obtain a facing having say 4½% carbon, depends upon the manner in which the composition is fused electrically. When fused by electrical arc welding, an excess of carbon must be supplied, and this excess is burned away during the welding process and serves to maintain reducing conditions and thus prevent oxidation of the tungsten. Thus when using electrical arc welding, as in the preferred form of my method, I have found that good results can be obtained by utilizing a plastic homogeneous composition containing about 10% of carbon, and about 90% tungsten powder.

If oxidation of the tungsten is prevented by means other than by utilizing an excess of carbon, the percentage of carbon in the composition can be accordingly reduced. For example if the welding arc is enveloped in a neutral or reducing atmosphere, such as an atmosphere of hydrogen or nitrogen, the percentage of carbon in the plastic composition can be reduced to from say 4 to 6%. Similarly the tungsten content can be reduced when welding by an atomic hydrogen flame, since the hydrogen flame serves to provide a reducing atmosphere. An atomic hydrogen flame for welding purposes utilizes an electrical welding equipment and can be termed an electrical welding method.

Figure 2:
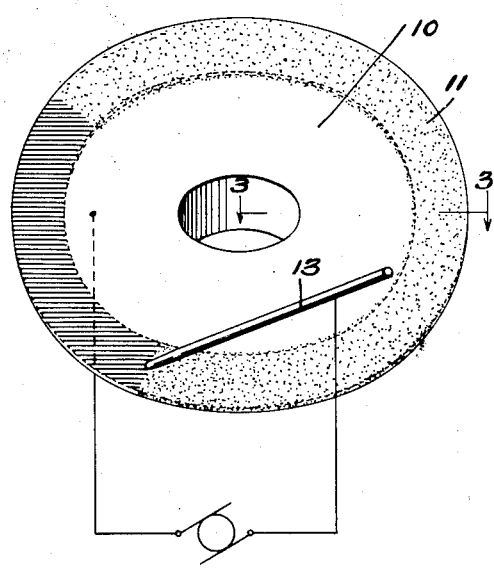
Fig. 2 is a plan view of the tool shown in Fig. 1, illustrating the manner in which the material is fused by means of an electric arc.
Figure 3:
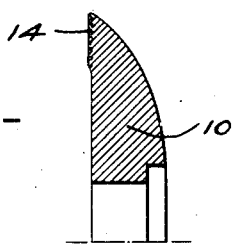
Fig. 3 is a cross sectional view taken along the line 3—3 of Fig. 2, and illustrating the hard metal facing when completed.

In the drawing I have shown a disc or rotary cutter 10 such as is used with rotary earth boring drills. By applying a hard tungsten carbide facing to a marginal portion of such a drill, its efficiency and useful life can be materially increased. In Fig. 1 I have shown a marginal portion 11 of this cutter having a relatively thin layer of my plastic composition applied, as by means of an ordinary paint brush 12. As indicated in Fig. 2, after the composition has dried an arc is then struck between a suitable carbon electrode 13 and the body of the cutter, and this arc is drawn along the marginal portion 11 to uniformly fuse the plastic composition. As shown in Fig. 3 the result of this method is to produce a hard metal facing 14 consisting chiefly of tungsten carbide, but containing also a certain amount of iron absorbed from the steel body of the cutter. If a facing of greater thickness is required, a plurality of additional layers can be similarly applied, and each successive layer will be harder than the preceding layer, due to the presence of a smaller percentage of iron.

While the above plastic composition is to be preferred, it is apparent that certain modifications may be made within the scope of the invention. For example a certain amount of carbon can be replaced by silicon or other equivalent elements, and a certain amount of the tungsten can be replaced by other elements such as nickel, uranium, molybdenum, manganese, vanadium, titanium, and chromium are examples of such elements. If the composition is modified by the addition of one or more such elements, I prefer that the amount of tungsten by sufficient to produce a facing having at least 45% of tungsten. In place of using powdered tungsten in unwrought form, it is possible to substitute certain tungsten ores in powdered condition, such as Wolframite, or Hubnerite. However in the event such tungsten ores are employed, an additional amount of carbon or an equivalent reducing agent must be employed to reduce these ores at the time of welding. For example a plastic composition containing about 9 pounds of powdered Wolframite mixed with about 2 pounds of powdered carbon, will result in a facing containing in the neighborhood of 4% carbon.

I claim:

1. A method of forming a hard metal facing upon a softer metal body comprising applying a layer of homogeneous plastic composition to the surface to be faced, said material containing the elements tungsten and carbon, and fusing said material by heat.

2. A method of forming a hard metal facing upon a softer metal body comprising applying a layer of homogeneous plastic composition to the surface to be faced, said material containing the element tungsten and uncombined carbon, and electrically fusing said material.

3. A method of forming a hard metal facing upon a softer metal body comprising applying a layer of homogeneous plastic composition to the surface to be faced, said material containing finely divided tungsten and divided uncombined carbon, and electrically fusing said material.

4. A method of forming a hard metal facing upon a softer metal body comprising utilizing a plastic homogeneous mixture containing divided tungsten and divided uncombined carbon with a liquid, applying a thin layer of said material to the surface of the body to be faced, and electrically fusing said mixture to form a tungsten carbide.

In testimony whereof, I have hereunto set my hand.

HARRY J. MORGAN.